US012431602B2

(12) United States Patent
Aquino et al.

(10) Patent No.: US 12,431,602 B2
(45) Date of Patent: Sep. 30, 2025

(54) SHORT-WAVELENGTH SPIN WAVE TRANSDUCER

(71) Applicant: University of Notre Dame du Lac, South Bend, IN (US)

(72) Inventors: Hadrian Aquino, South Bend, IN (US); Alexei Orlov, South Bend, IN (US); Gary H. Bernstein, South Bend, IN (US); Jonathan Chisum, South Bend, IN (US); David Connelly, South Bend, IN (US); Wolfgang Porod, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 207 days.

(21) Appl. No.: 18/185,756

(22) Filed: Mar. 17, 2023

(65) Prior Publication Data

US 2023/0299451 A1 Sep. 21, 2023

Related U.S. Application Data

(60) Provisional application No. 63/269,512, filed on Mar. 17, 2022.

(51) Int. Cl.
*H01P 1/218* (2006.01)
*H01F 10/32* (2006.01)

(52) U.S. Cl.
CPC ............. *H01P 1/218* (2013.01); *H01F 10/32* (2013.01)

(58) Field of Classification Search
CPC .......... H01P 1/218; H01P 1/215; H01P 1/203; H01F 10/32

(Continued)

(56) References Cited

U.S. PATENT DOCUMENTS 4,743,874 A * 5/1988 Kinoshita .............. H03H 2/001 333/219.2
5,168,254 A * 12/1992 Ito ........................... H01P 1/218 333/202

(Continued)

FOREIGN PATENT DOCUMENTS

EP 3384601 A1 10/2018
JP H05191108 A 7/1993

OTHER PUBLICATIONS

Yu et al., "Approaching soft X-ray wavelengths in nanomagnet-based microwave technology," Nat. Commun. 7:11255 doi: 10.1038/ncomms11255 (2016).

(Continued)

*Primary Examiner* — Stephen E. Jones
(74) *Attorney, Agent, or Firm* — Greenberg Traurig, LLP

(57) ABSTRACT

A device that produces spin waves includes a base substrate, a transducer that includes a first plane defined by a first magnetic film and a second plane defined by a plurality of metal strips, and a second magnetic film having a spin-wave phase velocity lower than the first magnetic film. The second magnetic film is adjacent to the first magnetic film, and the first plane and the second plane are parallel. The plurality of metal strips are configured to receive a first signal, such that the first signal excites a first spin wave in the first magnetic film. The second magnetic film is configured to produce a second spin wave having a wavelength shorter than the first spin wave.

20 Claims, 3 Drawing Sheets

(58) Field of Classification Search
USPC ...................... 333/219, 219.2, 202, 142, 186
See application file for complete search history.

(56) References Cited

U.S. PATENT DOCUMENTS

| | | | |
|---|---|---|---|
| 6,690,624 B2 | 2/2004 | Shimazaki et al. | |
| 9,846,134 B2 | 12/2017 | Yang et al. | |
| 10,033,078 B2 | 7/2018 | Ciubotaru et al. | |
| 10,613,129 B2 | 4/2020 | Csaba et al. | |
| 2015/0255846 A1* | 9/2015 | Sun | H01P 1/218<br>333/1.1 |

OTHER PUBLICATIONS

Inman et al., "Hybrid magnonics for short-wavelength spin waves facilitated by a magnetic heterostructure," Mar. 31, 2022.
Papp et al., "Hybrid yttrium iron garnet-ferromagnet structures for spin-wave devices," J. Appl. Phys. 117, 17E101 (2015).

* cited by examiner

SHORT-WAVELENGTH SPIN WAVE TRANSDUCER

STATEMENT REGARDING FEDERALLY SPONSORED RESEARCH OR DEVELOPMENT

This invention was made with government support under contract 1731824 awarded by the National Science Foundation. The government has certain rights in the invention.

CROSS-REFERENCE TO RELATED APPLICATION

This application is a non-provisional conversion of U.S. Pat. App. No. 63/269,512 entitled "SHORT-WAVELENGTH SPIN WAVE TRANSDUCER," filed Mar. 17, 2022, the contents of which are incorporated in their entirety and for all purposes.

TECHNICAL FIELD

The present description relates generally to producing high-frequency spin waves that have ultra-small wavelengths and more particularly using large waveguides to excite long-wavelength spin waves that convert to short-wavelength spin waves.

BACKGROUND

Spin waves allow for the manufacture of smaller circuitry. As such, it is desirable to fabricate microwave devices in the chip-scale using spin waves.

SUMMARY

In one example, a device that produces ultra-small-wavelength spin waves is disclosed. The device includes a base substrate, a transducer that includes a first plane defined by a first magnetic film and a second plane defined by a plurality of metal strips, and a second magnetic film having a spin-wave phase velocity lower than the first magnetic film. The second magnetic film is adjacent to the first magnetic film, and the first plane and the second plane are parallel. The plurality of metal strips are configured to receive a first signal, such that the first signal excites a first spin wave in the first magnetic film. The second magnetic film is configured to produce a second spin wave having a wavelength shorter than the first spin wave.

In one embodiment, a method to produce ultra-small-wavelength spin waves, the method includes placing a transducer on a base substrate, the transducer including a first plane defined by a first magnetic film and a second plane defined by a plurality of metal strips, and placing a second magnetic film on the base substrate, the second magnetic film having a spin-wave phase velocity lower than the first magnetic film. The second magnetic film is adjacent to the first magnetic film, and the first plane and the second plane are parallel. The plurality of metal strips are configured to receive a first signal, such that the first signal excites a first spin wave in the first magnetic film. The second magnetic film is configured to produce a second spin wave having a wavelength shorter than the first spin wave.

Finally in another example, a device that produces spin waves includes a base substrate. a transduce including a first plane defined by a first magnetic film, a second plane defined by an insulator, and a third plane defined by a plurality of metal strips, and a second magnetic film, having a spin-wave phase velocity lower than the first magnetic film. The second magnetic film is adjacent to the first magnetic film, and the first plane and the second plane are parallel. The plurality of metal strips are configured to receive a first signal, such that the first signal excites a first spin wave in the first magnetic film. The second magnetic film is configured to produce a second spin wave having a wavelength shorter than the first spin wave

DETAILED DESCRIPTION

Figure 1:
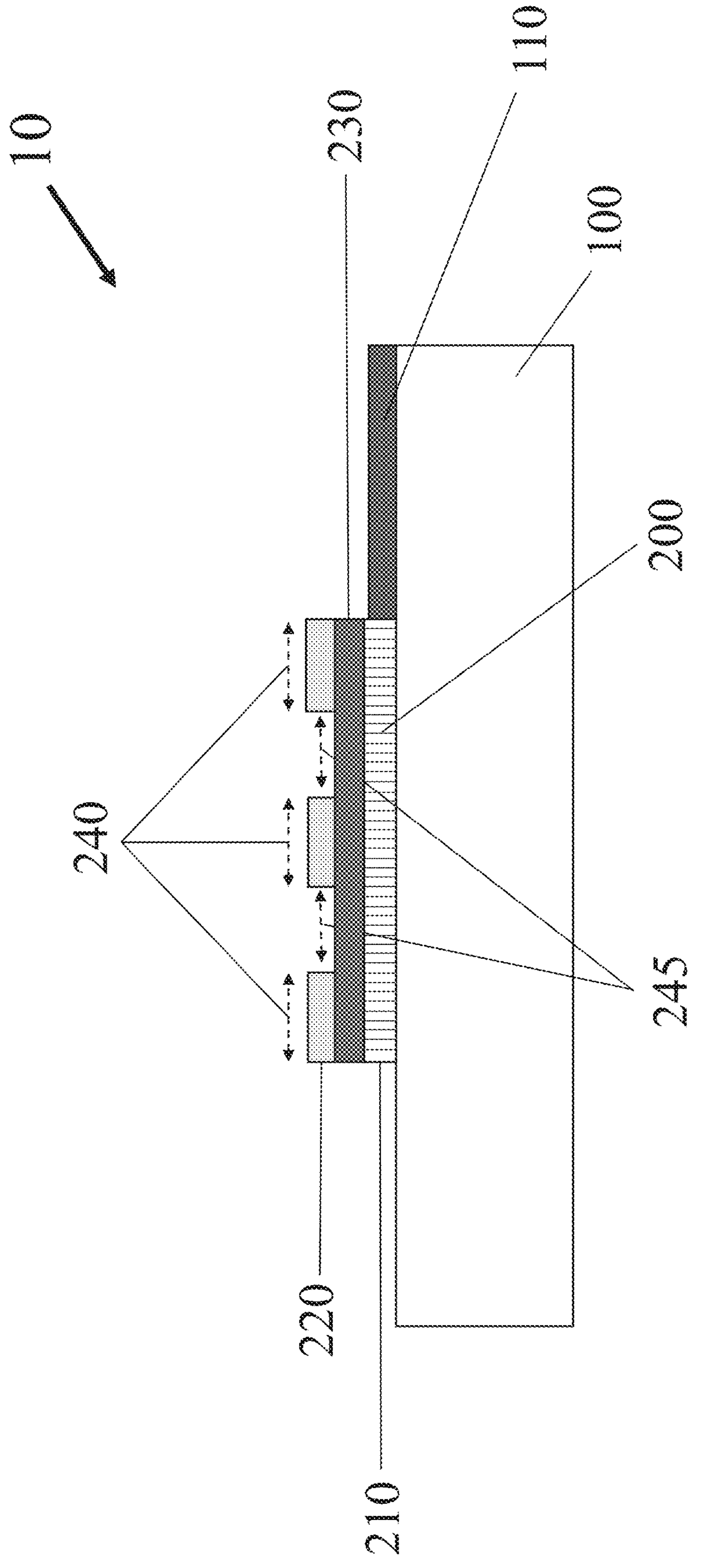
FIG. 1 is a side view of an example device for producing ultra-small-wavelength spin waves in accordance with the various examples disclosed herein.

Due to the acceleration of energy loss from heat generation caused by placing too many transistors into circuits, it is desirable to develop devices and methods to construct circuits that do not lose energy or lose very little energy. To overcome the size limitations on circuitry, signal processing using magnons has become an area of increasing interest. Magnons, unlike electrons, are not individual particles but are instead a quantized "chunk" or unit of electron spin (or spin-wave). Spin-wave propagation, unlike electrical currents, do not involve the transfer of matter, but can be used to transmit information. Spin is an innate movement for all electrons, so quantized spin-waves are able to move through an electrically insulating material to transmit energy without moving any electrons. Therefore, magnons can propagate without generating much heat or losing much energy.

Spin waves also allow for the manufacture of smaller circuitry. Microwave devices, an essential part of telecommunication and defense systems, have relatively long wavelengths (e.g., in the millimeter range). As such, it is challenging to fabricate microwave devices in the chip-scale. Spin waves, on the other hand, typically have much shorter wavelengths (e.g. in the micrometer range), which allows for the fabrication of smaller microwave devices.

Due to spin waves having relatively short wavelengths, tunable properties, and other exploitable phenomena (such as their nonlinearity), spin waves are promising for use in signal processing and computing devices. Some of these devices include on-chip, high-frequency, real-time spectrum sensors, signal-to-noise enhancers, and frequency selective limiters. Spin waves can also be made to oscillate at the kind of frequencies that are common to cellular phones, wireless networks, radar, line-of-site microwave relay links, satellite communications, and a plethora of other important and common applications. For spin-wave devices (or magnonic devices) to be useful, an efficient means for converting electric signals into spin waves is necessary. This structure is commonly referred to as a "spin-wave launcher."

A common way to launch spin waves is to use a row of metal wires placed on top of magnetic film. The metal wires (or "coplanar waveguide") act as an antenna such that its current induces a magnetic field to launch the spin wave. The width of the waveguide determines the wavelength that is most efficiently launched. To launch short wavelengths, the widths of the wires of the antenna must be much shorter than those wavelengths. For example, for an antenna designed for a wavelength of about 125 nm (1 nm=1/1,000 μm), the width of the metal wires must be 30 nm, and they must be placed 30 nm apart. However, decreasing the width of the metal wires significantly increases the loss in electrical signal, and devices based on spin waves will not be practical to produce at these size scales.

Launching short-wavelength spin-waves is challenging. If the magnetic field from a coplanar waveguide (CPW) is used, the dimensions of the coplanar waveguide are typically required to be in the 10 nm (10×10^−9 m) range to produce spin waves with wavelengths in the 100 nm range. Delivering current to such a small CPWs is difficult, so larger CPWs are preferred.

At least one major roadblock in the adoption of spin-wave based microwave devices is the challenge of fabricating these devices on silicon. Yttrium iron garnet (YIG) has become the preferred material for spin-wave devices because spin waves can travel in YIG for relatively long distances before fading. However, integrating high-quality YIG with silicon has proven to be a challenge to date.

The following disclosure of example methods and apparatus is not intended to limit the scope of the description to the precise form or forms detailed herein. Instead, the following disclosure is intended to be illustrative so that others may follow its teachings.

Figure 2:
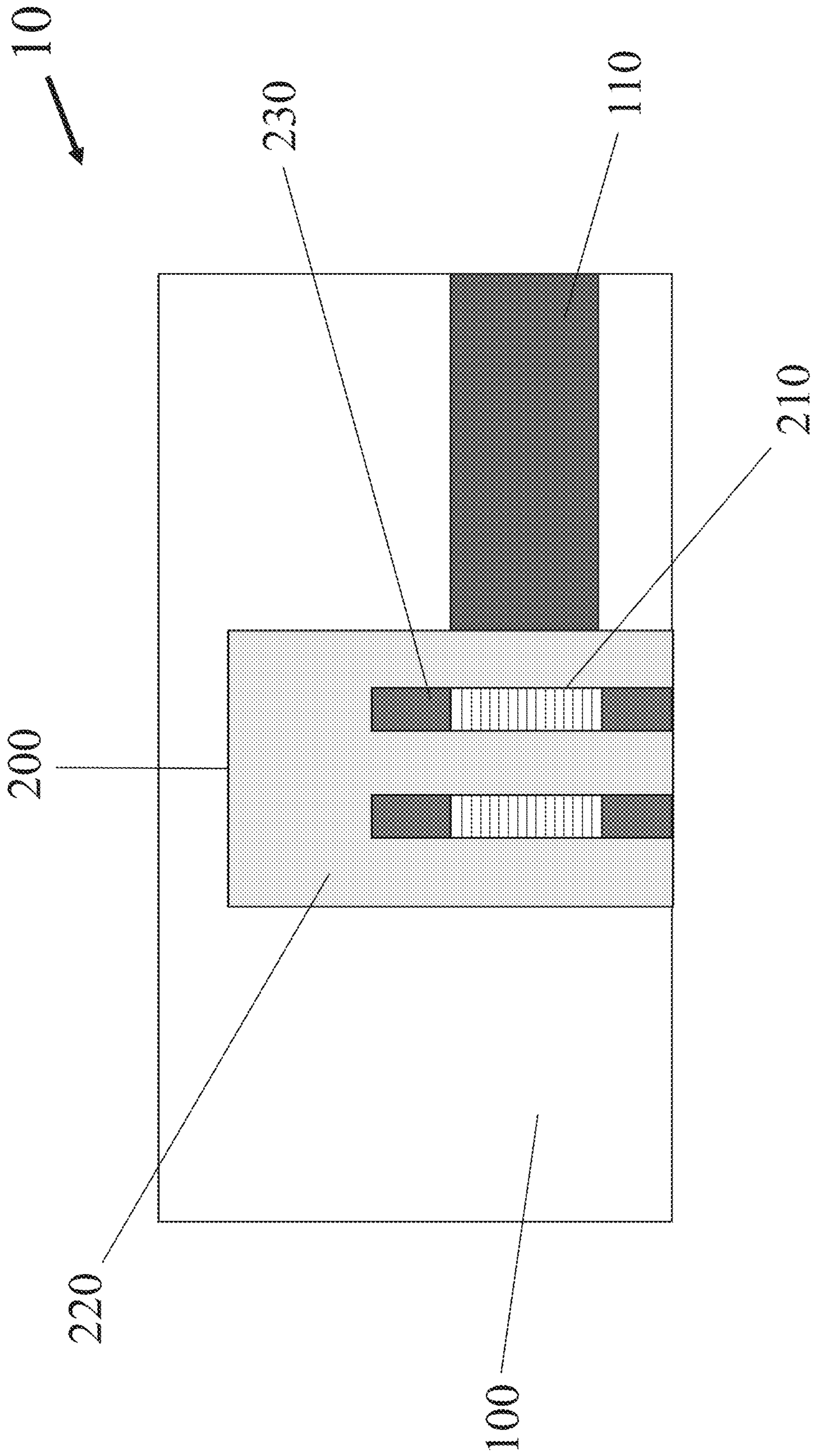
FIG. 2 is a top view of the device of FIG. 1 in accordance with the various examples disclosed herein.

FIG. 1 is a side view of an example device 10 for producing high-frequency spin waves with ultra-small wavelengths. FIG. 2 is a top view of the device 10 of FIG. 1. As shown in FIGS. 1-2, the example device 10 includes a base substrate 100, a transducer 200, and a second magnetic film 110.

In the present example, the base substrate 100 is gadolinium gallium garnet. In some examples, the base substrate is any dielectric suitable material (e.g., a material that is an electrical insulator that may be polarized by an applied electric field). The base substrate 100 may prohibit the flow of electric charges through the material because the base substrate 100 may have no free electrons, but rather electrons that slightly shift from their average equilibrium positions which may result in dielectric polarization. In some examples, the base substrate is any semiconductor material (e.g., a material that with electrical conductivity between an insulator and a conductor).

In the present example, the second magnetic film 110 is yttrium iron garnet (YIG). In some examples, the second magnetic film 110 is any highly permeable magnetic material that supports spin waves with low loss. For example, the second magnetic film 110 may be a high-quality or low-quality YIG. In some examples, the second magnetic film 110 may be any suitable magnetic material (e.g., magnetite, nickel, iron, or cobalt) that allows for the propagation of spin waves.

The transducer 200 includes a first plane 210 and a second plane 220. The first plane 210 may be a Supermalloy film, an alloy composed of nickel, iron, and molybdenum. In some examples, the first plane 210 is any magnetic film made of magnetic material with a higher spin-wave phase velocity than that of the second magnetic film 110.

In some embodiments, the transducer 200 includes a third plane 230 between the first plane 210 and the second plane 220 to electrically isolate the second plane 220 from the first plane 210. In some embodiments, the third second plane 230 is silicon dioxide. The third plane 230 may be any suitable material for electrical separation, or insulation between two electrical current-using materials (e.g., glass, porcelain, or composite polymers).

The example second plane 220 is a plurality of metal strips. In some examples, the metal strips are formed of any metal suitable for conduction (e.g., gold, copper, iron, aluminum, or silver) such that the metal strips may carry the electromagnetic signal. In some examples, the second plane 220 is a plurality of gold strips. The plurality of metal strips may be three parallel strips, such that the transducer 200 includes a single conducting track between two return conductors. In other examples, the plurality of metal strips may be two parallel strips, such that the transducer 200 includes a single conducting track a single return conductor. In other examples, there may be only a single parallel strip. The transducer 200 may include all metal strips on the same side of the base substrate 100. The return conductors may be separated from the central track by a small gap. The small gap may have a constant width along the length of the metal strips.

In some examples, the transducer 200 is a microwave waveguide. The transducer 200 may be any suitable waveguide (structure that guides waves with minimal loss of energy by restricting the transmission of energy to a single direction) for launching spin waves or conveying microwave-frequency signals. In some examples, the second plane 220 is made of gold metal strips of a width 240 and separated by a gap 245. In some examples the return conductor could be on the backside of the base substrate 100 in the form of a microstrip waveguide.

In some examples, the example device 10 is integrated into a silicon microchip. The silicon microchip may be integrated into a communication device, for use in on-chip, high-frequency, real-time spectrum sensors, signal-to-noise enhancers, frequency selective limiters, cellular phones, wireless networks, radar, line-of-site microwave relay links, satellite communications, or any other suitable electronic device or integrated circuit that either utilizes or may utilize spin waves.

The example device 10 may launch a long-wavelength spin wave that is then converted into a short-wavelength spin wave. When the second plane 220 of the plurality of metal strips is over the first magnetic film of the first plane 210, the magnetic fields from the second plane 220 may efficiently couple to the first plane 210. Input power to the second plane 220 of the transducer 200 may induce a magnetic field to launch a spin wave in the first plane 210. As the spin wave propagates between the first plane 210 and the second magnetic film 110, it remains at the same frequency. However, the wavelength of the spin wave is shorter in the second magnetic film 110 because the spin wave slows down as it propagates through the second magnetic film 110, resulting in a decrease in wavelength. This may be illustrated by the fixed relationship of speed to wavelength and frequency (e.g., speed=wavelength (μm)× wave frequency (GHz)).

Figure 3:
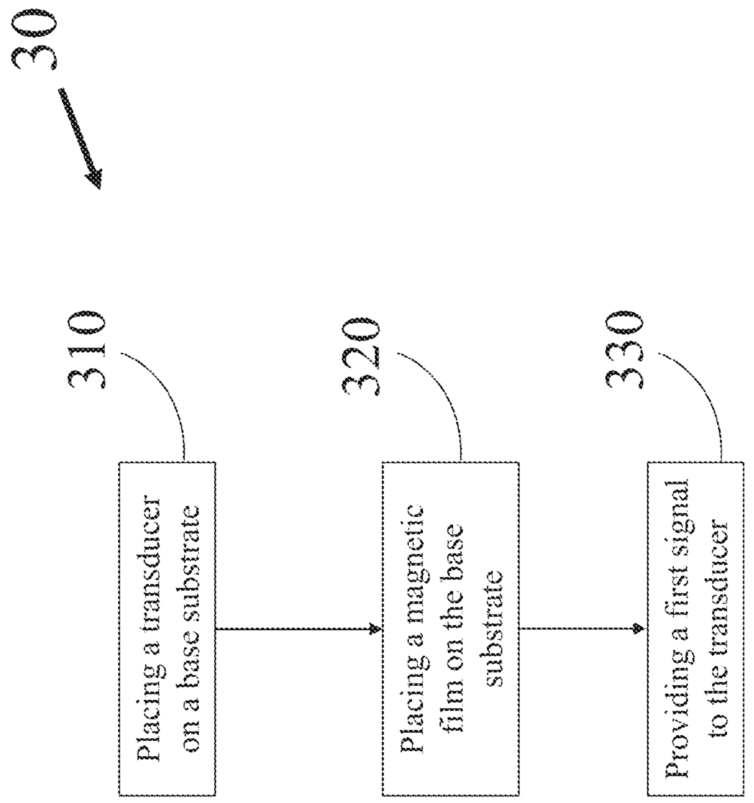
FIG. 3 is a flow chart illustrating an example method of producing ultra-small-wavelength spin waves in accordance with the various examples disclosed herein.

FIG. 3 is a flow chart illustrating an example method of producing high-frequency spin waves with ultra-small wavelengths.

In step 310, the transducer 200 is placed on the base substrate 100.

In step 320, the second magnetic film 110 is placed on the base substrate 100. In some examples, the transducer 200 is placed on the base substrate 100 before the second magnetic film 110 is placed on the base substrate 100. In the present example, the second magnetic film 110 and the transducer 200 can be placed on the base substrate 100 in any order.

In step 330, a first signal is provided to the second plane 220 of transducer 200 such that the first signal excites a first spin wave in the first magnetic film of the first plane 210 of transducer 200. In some examples, the first signal is provided at a power suitable power for launching spin waves, such as 1 μW. In some examples, the spin wave is launched at a frequency suitable for launching spin waves, such as any frequency between 0.7 GHz and 150 GHz. The first spin wave travels from the first magnetic film of the first plane 210 to become a second spin wave in the adjacent second magnetic film 110. The second spin wave has a wavelength shorter than the first spin wave due to the reduced speed of the spin wave in the second magnetic film 110 but constant frequency.

In some examples, the device may work in reverse such that a short-wavelength spin wave may be converted into a spin wave with a long-wavelength at the same frequency. The spin wave may be launched in the first plane 210 and propagated through the second magnetic film 110. The spin wave, upon reaching the edge of the second magnetic film 110 and re-entering the first plane 210, may be converted back into its long-wavelength.

While this disclosure has described certain examples, it will be understood that the claims are not intended to be limited to these examples except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed examples. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

What is claimed is:

1. A device that produces ultra-small-wavelength spin waves, comprising:
- a base substrate;
- a transducer, comprising:
  - a first plane defined by a first magnetic film; and
  - a second plane defined by a plurality of metal strips; and
- a second magnetic film, having a spin-wave phase velocity lower than the first magnetic film, wherein the second magnetic film is adjacent to the first magnetic film,
- wherein the first plane and the second plane are parallel, the plurality of metal strips are configured to receive a first signal, such that the first signal excites a first spin wave in the first magnetic film, and the second magnetic film is configured to produce a second spin wave having a wavelength shorter than the first spin wave.

2. The device of claim 1, wherein the transducer comprises a third plane defined by an insulator.

3. The device of claim 2, wherein the insulator is silicon dioxide.

4. The device of claim 1, wherein the first signal is a radio-frequency electrical signal.

5. The device of claim 4, wherein the radio-frequency electrical signal is 0.7 GHz to 150 GHz.

6. The device of claim 1, wherein the base substrate is gadolinium gallium garnet.

7. The device of claim 1, wherein the first magnetic film is Supermalloy film.

8. The device of claim 1, wherein the second magnetic film is yttrium iron garnet.

9. The device of claim 1, wherein the plurality of metal strips comprises three parallel metal strips.

10. The device of claim 9, wherein each of the three metal strips are separated from another of the three metal strips by a distance of 30 nm to 10 mm.

11. The device of claim 9, wherein the three metal strips have a width between 30 nm to 10 mm.

12. The device of claim 9, wherein the three metal strips are electrical conductors.

13. A device that produces ultra-small-wavelength spin waves, comprising:
- a base substrate;
- a transducer, comprising:
  - a first plane defined by a first magnetic film;
  - a second plane defined by an insulator; and
  - a third plane defined by a plurality of metal strips; and
- a second magnetic film, having a spin-wave phase velocity lower than the first magnetic film, wherein the second magnetic film is adjacent to the first magnetic film,
- wherein:
  - the first plane, the second plane, and the third plane are parallel, such that the third plane abuts the second plane, the second plane abuts the first plane, and the first plane abuts the base substrate,
  - the plurality of metal strips are configured to receive a first signal, such that the first signal excites a first spin wave in the first magnetic film, and
  - the second magnetic film is configured to produce a second spin wave having a wavelength shorter than the first spin wave.

14. The device of claim 13, wherein the second magnetic film is yttrium iron garnet.

15. A method to produce ultra-small-wavelength spin waves, comprising:
- placing a transducer on a base substrate, the transducer comprising:
  - a first plane defined by a first magnetic film; and
  - a second plane defined by a plurality of metal strips; and
- placing a second magnetic film on the base substrate, the second magnetic film having a spin-wave phase velocity lower than the first magnetic film, wherein the second magnetic film is adjacent to the first magnetic film,
- wherein the first plane and the second plane are parallel, the plurality of metal strips are configured to receive a first signal, such that the first signal excites a first spin wave in the first magnetic film, and the second magnetic film is configured to produce a second spin wave having a wavelength shorter than the first spin wave.

16. The method of claim 15, wherein the transducer comprises a third plane defined by an insulator.

17. The method of claim 16, wherein the insulator is silicon dioxide.

18. The method of claim 15, wherein the first signal is a radio-frequency electrical signal.

19. The method of claim 18, wherein the radio-frequency electrical signal has a frequency of between 0.7 GHz to 150 GHz.

20. The method of claim 15, wherein the plurality of metal strips comprises three parallel metal strips.

* * * * *